(12) United States Patent
Keller et al.

(10) Patent No.: US 12,232,188 B2
(45) Date of Patent: Feb. 18, 2025

(54) SESSION ESTABLISHMENT WITH A LOCAL SERVING NETWORK

(71) Applicant: Telefonaktiebolaget LM Ericsson (publ), Stockholm (SE)

(72) Inventors: Ralf Keller, Würselen (DE); Maria Belen Pancorbo Marcos, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 386 days.

(21) Appl. No.: 17/619,399

(22) PCT Filed: Nov. 13, 2019

(86) PCT No.: PCT/EP2019/081244
§ 371 (c)(1),
(2) Date: Dec. 15, 2021

(87) PCT Pub. No.: WO2020/259862
PCT Pub. Date: Dec. 30, 2020

(65) Prior Publication Data
US 2022/0312510 A1 Sep. 29, 2022

(30) Foreign Application Priority Data
Jun. 26, 2019 (EP) .................................. 19382540

(51) Int. Cl.
*H04W 76/10* (2018.01)
*H04L 65/1016* (2022.01)
*H04W 40/02* (2009.01)

(52) U.S. Cl.
CPC ......... *H04W 76/10* (2018.02); *H04L 65/1016* (2013.01); *H04W 40/02* (2013.01)

(58) Field of Classification Search
CPC ....... H04W 76/10; H04W 40/02; H04W 4/24; H04W 28/10; H04W 28/12;
(Continued)

(56) References Cited

U.S. PATENT DOCUMENTS

2022/0272620 A1* 8/2022 Ninglekhu ............ H04W 88/02

OTHER PUBLICATIONS

"3GPP TS 23.503 V16.1.0", 3rd Generation Partnership Project; Technical Specification Group Services and System Aspects; Policy and Charging Control Framework for the 5G System; Stage 2 (Release 16), Jun. 2019, pp. 1-99.
(Continued)

*Primary Examiner* — Eric Myers
(74) *Attorney, Agent, or Firm* — Weisberg I.P. Law, P.A.

(57) ABSTRACT

There is provided mechanisms for establishing a communication session with a local serving network. A method is performed by a terminal device. The method comprises obtaining an indication of traffic to be communicated. The traffic is associated with a traffic descriptor. The method comprises selecting a URSP rule for the traffic to be communicated in a communication session with the local serving network. The URSP rule is selected in accordance with the traffic descriptor and in accordance with a validity condition for the communication session. The validity condition at least pertains to network support for IMS in the local serving network. The method comprises establishing a communication session with the local serving network for communicating the traffic according to the selected URSP rule.

15 Claims, 6 Drawing Sheets

(58) Field of Classification Search
CPC . H04L 65/1016; H04L 67/60; H04L 12/1407; H04M 15/57; H04M 15/66; H04M 15/8055; H04M 15/8061; H04M 15/8228; H04M 15/8044
See application file for complete search history.

(56) References Cited

OTHER PUBLICATIONS

"Adding Support for Delivering Background Data Transfer Polices to the UE", 3GPP TSG-SA2 Meeting #133; S2-1905893; Reno, NV, USA,, May 13-17, 2019, pp. 1-12.
"Adding support for unified access control in SNPNs (Stand-alone Non-Public Networks)", 3GPP TSG-CT WG1 Meeting #117; Reno (NV), USA; C1-193503 (was C1-193115), May 13-17, 2019, pp. 1-40.
"3GPP TS 23.502 V16.1.1", 3rd Generation Partnership Project; Technical Specification Group Services and System Aspects; Procedures for the 5G System; Stage 2 (Release 16), Jun. 2019, pp. 1-495.
"3GPP TS 23.501 V16.1.0", 3rd Generation Partnership Project; Technical Specification Group Services and System Aspects; System Architecture for the 5G System; Stage 2 (Release 16), Jun. 2019, pp. 1-368.

\* cited by examiner

SESSION ESTABLISHMENT WITH A LOCAL SERVING NETWORK

TECHNICAL FIELD

Embodiments presented herein relate to a method, a terminal device, a computer program, and a computer program product for establishing a communication session with a local serving network. Embodiments presented herein further relate to a method, a policy control function (PCF) entity, a computer program, and a computer program product for enabling the terminal device to establish a communication session with the local serving network.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is the concept of User Equipment (UE) Route Selection Policy (URSP) rules as defined in the third generation partnership project (3GPP) technical specification (TS) 23.503 entitled "Policy and charging control framework for the 5G System (5GS); Stage 2", version 16.1.0 (and also in 3GPP TS 23.501 entitled "System architecture for the 5G System (5GS)", version 16.1.0, and 3GPP TS 23.502 entitled "Procedures for the 5G System (5GS)", version 16.1.1). URSP rules, if present, are used by the UE to determine Single Network Slice Selection Assistance Information (S-NSSAI), Data Network Name (DNN) and Session and Service Continuity (SCC) mode for Protocol data Unit (PDU) Session establishment, to establish one or multiple PDU sessions using one or more S-NSSAIs.

URSP rules can be pre-configured or provisioned to the UE. If URSP rules are not available in the UE, or there is no matching URSP rule, and there is no UE local configuration, the UE does not indicate S-NSSAI in the PDU Session Establishment procedure. Network-initiated Non-Access Stratum (NAS) transport procedure can be used by the Access Management Function (AMF), or similar, in the core network to update one or more URSP rules for the UE (and for providing the same to the UE).

The procedure used by the UE to associate applications to PDU sessions using URSP rules are described in aforementioned 3GPP TS 23.503, clause 6.6.2.3, as summarized in the following where the UE associates application traffic to PDU sessions using URSP rules in a three-step process.

First, the UE selects a URSP rule. In more detail, for a newly detected application, the UE evaluates the URSP rules in the order of rule precedence and determines if the application is matching the traffic descriptor of any URSP rule. If a URSP rule is found this URSP rule is applicable to the application.

Second, the UE selects a Route Selection Descriptor (RSD). In more detail, the UE selects an RSD within the selected URSP rule in the order of the Route Selection Descriptor Precedence. The UE selects an RSD that fulfills conditions. These conditions are checked by the UE and are not included in the URSP rule definition. If any S-NSSAI(s) is present, the S-NSSAI(s) must also be in the Allowed NSSAI. If any DNN is present and the DNN is a Local Area Data Network (LADN) DNN, the UE is in the area of availability of this LADN. If Access Type preference is present and set to Multi-Access, the UE supports Access Traffic Steering, Switching and Splitting (ATSSS).

Third, the UE selects a PDU session. In more detail, the UE determines if there is an existing PDU session that matches all components in the selected Route Selection Descriptor. When a matching PDU session exists, the UE associates the application to the existing PDU session, i.e. routes the traffic of the detected application on this PDU session. If none of the existing PDU sessions matches, the UE tries to establish a new PDU session using the values specified by the selected Route Selection Descriptor. If the PDU Session Establishment Request is accepted, the UE associates the application to this new PDU session. If the UE fails to establish a PDU session with any of the Route Selection Descriptors, the UE tries other URSP rules in the order of Rule Precedence with matching Traffic Descriptors, except the URSP rule with the "match-all" Traffic descriptor, if any.

In addition, the UE reevaluates the validity of the URSP rules when certain conditions are met. For example, one condition could be that the URSP rule is updated by the Policy and Control Function (PCF), or similar, in the core network. Another conditions could be that there is a change of Allowed NSSAI or Configured NSSAI or change of LADN DNN availability.

However, there is still a need for an improved session establishment procedure for the UE.

SUMMARY

An object of embodiments herein is to provide efficient session establishment for a terminal device.

According to a first aspect there is presented a terminal device for establishing a communication session with a local serving network. The terminal device comprises processing circuitry. The processing circuitry is configured to cause the terminal device to obtain an indication of traffic to be communicated. The traffic is associated with a traffic descriptor. The processing circuitry is configured to cause the terminal device to select a URSP rule for the traffic to be communicated in a communication session with the local serving network. The URSP rule is selected in accordance with the traffic descriptor and in accordance with a validity condition for the communication session. The validity condition at least pertains to network support for IMS in the local serving network. The processing circuitry is configured to cause the terminal device to establish a communication session with the local serving network for communicating the traffic according to the selected URSP rule.

According to a second aspect there is presented a terminal device for establishing a communication session with a local serving network. The terminal device comprises an obtain module configured to obtain an indication of traffic to be communicated. The traffic is associated with a traffic descriptor. The terminal device comprises a select module configured to select a URSP rule for the traffic to be communicated in a communication session with the local serving network. The URSP rule is selected in accordance with the traffic descriptor and in accordance with a validity condition for the communication session. The validity condition at least pertains to network support for IMS in the local serving network. The terminal device comprises an establish module configured to establish a communication session with the local serving network for communicating the traffic according to the selected URSP rule.

According to a third aspect there is presented a method for establishing a communication session with a local serving network. The method is performed by a terminal device. The method comprises obtaining an indication of traffic to be communicated. The traffic is associated with a traffic descriptor. The method comprises selecting a URSP rule for the traffic to be communicated in a communication session with the local serving network. The URSP rule is selected in accordance with the traffic descriptor and in accordance with a validity condition for the communication session. The validity condition at least pertains to network support for IMS in the local serving network. The method comprises establishing a communication session with the local serving network for communicating the traffic according to the selected URSP rule.

According to a fourth aspect there is presented a computer program for establishing a communication session with a local serving network. The computer program comprises computer program code which, when run on processing circuitry of a terminal device, causes the terminal device to perform a method according to the third aspect.

According to a fifth aspect there is presented a policy control function, PCF, entity for enabling a terminal device to establish a communication session with a local serving network. The PCF entity comprises processing circuitry. The processing circuitry is configured to cause the PCF entity to obtain a modification to a URSP rule used by the terminal device for establishing a communication session with the local serving network for communicating traffic. The URSP rule is associated with a validity condition. The validity condition at least pertains to network support for IMS in the local serving network. The processing circuitry is configured to cause the PCF entity to provide the modification of the URSP rule towards the terminal device.

According to a sixth aspect there is presented a policy control function, PCF, entity for enabling a terminal device to establish a communication session with a local serving network. The PCF entity comprises an obtain module configured to obtain a modification to a URSP rule used by the terminal device for establishing a communication session with the local serving network for communicating traffic. The URSP rule is associated with a validity condition. The validity condition at least pertains to network support for IMS in the local serving network. The PCF entity comprises a provide module configured to provide the modification of the URSP rule towards the terminal device.3

According to a seventh aspect there is presented a method for enabling a terminal device to establish a communication session with a local serving network. The method is performed by a policy control function, PCF, entity of the local serving network. The method comprises obtaining a modification to a URSP rule used by the terminal device for establishing a communication session with the local serving network for communicating traffic. The URSP rule is associated with a validity condition. The validity condition at least pertains to network support for IMS in the local serving network. The method comprises providing the modification of the URSP rule towards the terminal device.

According to an eight aspect there is presented a computer program for enabling a terminal device to establish a communication session with a local serving network, the computer program comprising computer program code which, when run on processing circuitry of a PCF entity, causes the PCF entity to perform a method according to the seventh aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously these methods, these terminal devices, these PCF entities, and these computer programs provide efficient session establishment for the terminal devices.

Advantageously these methods, these terminal devices, these PCF entities, and these computer programs enable a URSP rule in the terminal device only to be triggered, or used, if the conditions e.g. for IMS Voice over PS support apply. This prevents unnecessary session establishment setup to allow the terminal device to register to the IMS, even if no IMS voice service is supported in the local serving network.

Advantageously these methods, these terminal devices, these PCF entities, and these computer programs allows to have multiple URSP rules also for the same DNN, and in case of the IMS DNN, there are URSP rules that could always triggered, or used, independent of IMS voice support indication, there are URSP rules that could only be triggered, or used, if IMS voice is supported, and there are URSP rules that could only be triggered, or used, if IMS voice is not supported.

Advantageously these methods, these terminal devices, these PCF entities, and these computer programs thereby allow a fine grain control of the terminal device behavior e.g. in roaming cases. If also having conditions like MNC and MCC, certain URSP rules are only triggered, or used, if the terminal device is connected to a network with this MNC and MCC, e.g. in the home network or only in particular roaming networks.

It is to be noted that any feature of the first, second, third, fourth, fifth, sixth seventh, eight, and ninth aspects may be applied to any other aspect, wherever appropriate. Likewise, any advantage of the first aspect may equally apply to the second, third, fourth, fifth, sixth, seventh, eight, and/or ninth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
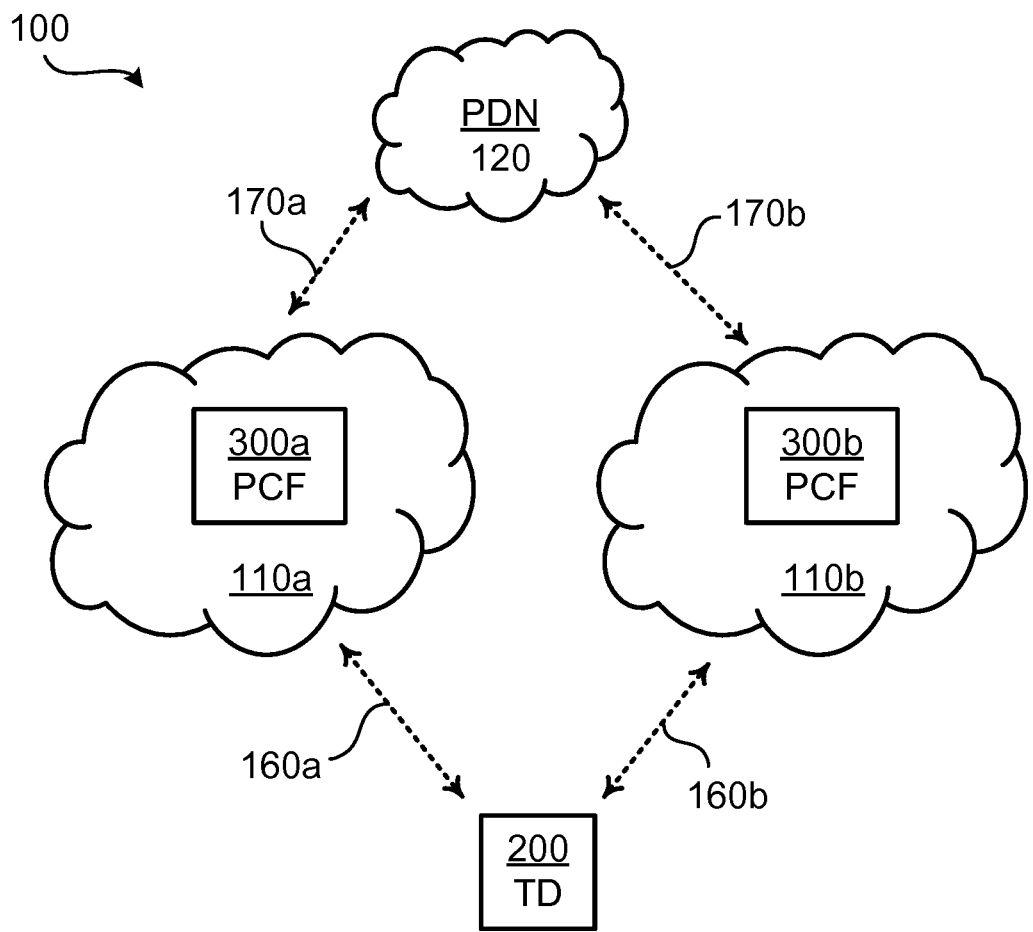
FIG. 1 is a schematic diagram illustrating a communication network according to embodiments.

FIG. 1 is a schematic diagram illustrating a communication network 100 where embodiments presented herein can be applied. As the skilled person understands, the communication network 100 of FIG. 1 is simplified compared to a real communication network 100 and show parts most relevant for the present disclosure. The communication network 100 comprises a home network 110a and a local serving network 110b representing a roaming network. The home network 110a and the local serving network 110b each provide network access to a terminal device (TD) 300. According to non-limiting examples the terminal devices 300 is any of a portable wireless device, mobile station, mobile phone, handset, wireless local loop phone, user equipment (UE), smartphone, laptop computer, tablet computer, wireless modem, wireless sensor device, network equipped vehicle, or Internet of Things (IoT) device.

Each of the home network 110a and the local serving network 110b comprises a respective PCF entity 300a, 300b. Each of the home network 110a and the local serving network 110b is configured to, over a respective link 170a, 170b, communicate with a packet data network (PDN) 120, such as the Internet.

Depending on the physical location of the terminal device 200, a communication session is established either with the home network 110a over wireless radio link 160a or with the local serving network 110b over wireless radio link 160b. The terminal device 200 is thereby enabled to access services of, and exchanging data with, the packet data network 120.

As noted above, there is a need for an improved session establishment procedure for the terminal device 200.

In more detail, currently a URSP rule may match (if the Traffic Descriptor matches the application traffic sent by the terminal device 200) according to 3GPP TS 23.503 and then a PDU session is established irrespective of some of the current network conditions. For example, a URSP rule containing the IMS DNN may be triggered and used even if the AMF in the local serving network 110b does not indicate IMS Voice support to the terminal device 200. The term "IMS" is an abbreviation for IP Multimedia Subsystem, as understood from 3GPP TS 23.503 and other 3GPP specifications cited herein. That is, a PDU session to the IMS DNN may be established independently of whether IMS voice is indicated as being supported in the local serving network 110b or not. However, the terminal device 200 may have multiple URSP rules for the same DNN, and in case of the IMS DNN, only a subset of the URSP rules should be triggered and used if IMS voice is not supported and possibly all URSP rules should be triggered and used if IMS voice is supported. There might also be a need to trigger and use a URSP rule only if IMS voice over PS is not supported, allowing thereby a fine grain control of the terminal device behavior. This could be of particular use in roaming cases (but not limited to roaming).

In particular, the list of conditions to select a valid RSD according to a URSP rule are limited and does not consider IMS Voice over PS support by the local serving network 110b. The terminal device 200 might therefore select a valid RSD according to any existing criteria, but the PDU session establishment will fail if the local serving network 110b does not support IMS Voice over PS. This could e.g. be the case if roaming agreements do not allow the establishment of a PDU session to this DNN. In this respect, the Session Management Function (SMF) in the HPLMN might reject it, and/or the AMF in the local serving network 110b might reject it.

The embodiments disclosed herein therefore relate to mechanisms for establishing a communication session with a local serving network 110b and enabling a terminal device 200 to establish a communication session with a local serving network 110b. In order to obtain such mechanisms, there is provided a terminal device 200, a method performed by the terminal device 200, a computer program product comprising code, for example in the form of a computer program, that when run on processing circuitry of the terminal device 200, causes the terminal device 200 to perform the method. In order to obtain such mechanisms, there is further provided a PCF entity 300b, a method performed by the PCF entity 300b, and a computer program product comprising code, for example in the form of a computer program, that when run on processing circuitry of the PCF entity 300b, causes the PCF entity 300b to perform the method.

Figure 2:
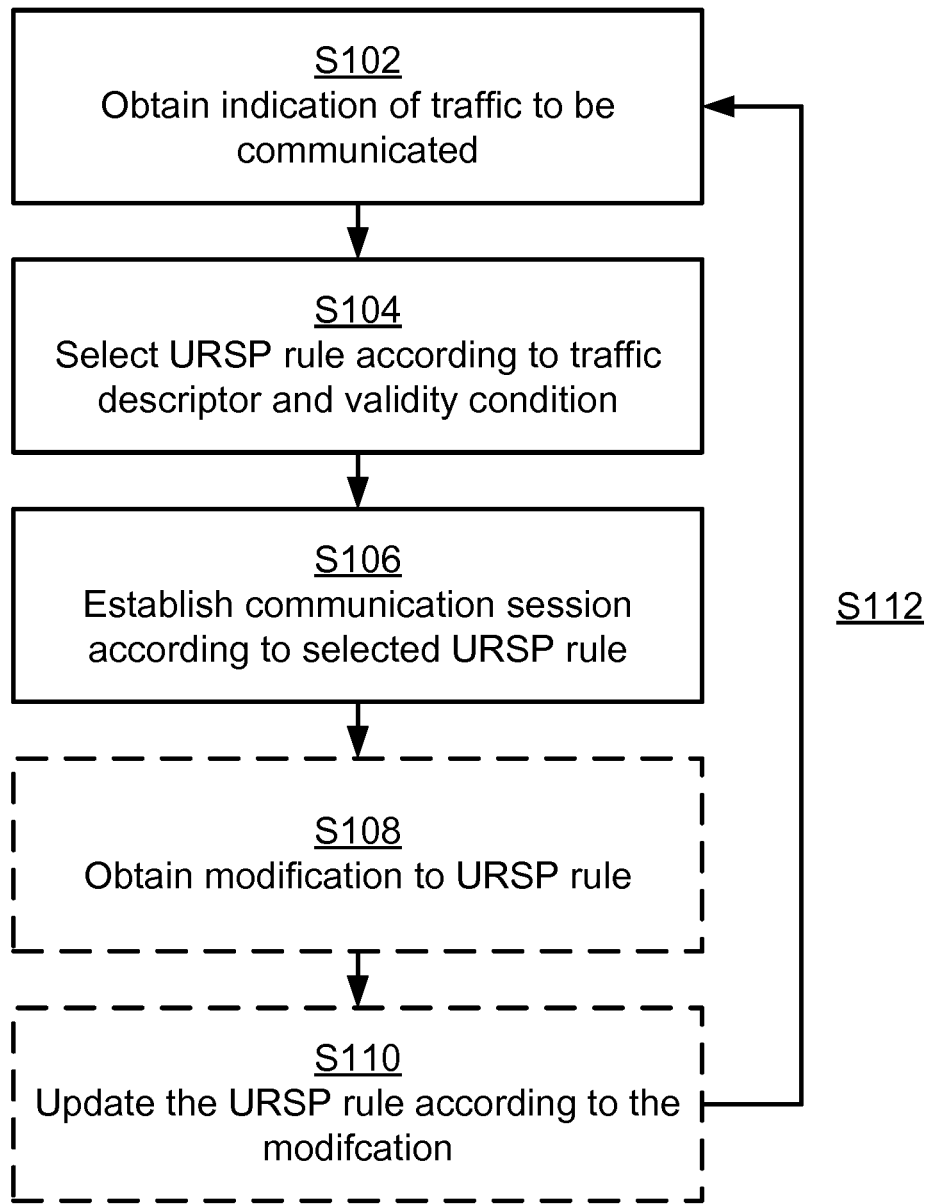
FIGS. 2 and 3 are flowcharts of methods according to embodiments.

Reference is now made to FIG. 2 illustrating a method for establishing a communication session with a local serving network 110b as performed by the terminal device 200 according to an embodiment.

S102: The terminal device 200 obtains an indication of traffic to be communicated. The traffic is associated with a traffic descriptor.

S104: The terminal device 200 selects a URSP rule for the traffic to be communicated in a communication session with the local serving network 110b. The URSP rule is selected in accordance with the traffic descriptor and in accordance with a validity condition for the communication session. The validity condition at least pertains to network support for IMS in the local serving network 110b.

S106: The terminal device 200 establishes a communication session with the local serving network 110b for communicating the traffic according to the selected URSP rule.

The terminal device 200 thus has at least one URSP rule, each having at least on validity condition related to support for IMS in the local serving network 110b. The terminal device 200 checks whether the condition apply when determining which URSP rule to trigger, or use, and then establishes a communication session accordingly.

Embodiments relating to further details of establishing a communication session with a local serving network 110b as performed by the terminal device 200 will now be disclosed.

Each URSP rule might be associated with validity conditions (one or multiple) that the URSP rule should only be triggered, or used, if the associated validity conditions are matched.

One of those validity conditions could be whether the local serving network 110b indicates IMS Voice over PS Support. That is, according to an embodiment, the validity condition pertaining to network support for IMS requires that IMS voice over PS is supported in the local serving network 110b.

Thereby, if the AMF (or MME) provides an IMS Voice over PS support indication to the terminal device 200, and IMS Voice over PS is supported, then the terminal device 200 can trigger, or use, any of the URSP rules that fulfil that condition.

However, not all URSP rules for IMS services must have such a condition, e.g. there can be one rule with such a condition for a first S-NSSAI (denoted S-NSSAI_x) and a second rule without such a condition for a second S-NSSAI (denoted S-NSSAI_y), and then the condition is an optional element in the URSP rule, but the terminal device 200 should support it.

In some aspects the validity condition further pertains to at least one of: emergency support in the local serving network 110b, the local serving network 110b supporting interworking over network interface N26, the local serving network 110b supporting interworking without network interface N26, which mobile country code (MCC) the local serving network 110b has, and which mobile network code (MNC) the local serving network 110b has.

In some aspects the URSP rule is selected from a set of URSP rules. Further, the terminal device 200 might be configured to select an RSD within the selected URSP rule. In further aspects, the URSP rule is selected only among those URSP rules in the set of URSP rules for which the validity condition for the communication session is fulfilled. The RSD might then be selected within the URSP rule with matching validity conditions.

There may be different ways for the terminal device 200 to have access to URSP rules.

According to a first example, the terminal device 200a is pre-configured with URSP rules. In particular, according to an embodiment, the URSP rule and/or the validity condition (and thus RSDs) is configured in the terminal device (200).

According to a second example, URSP rules may be provisioned to the terminal device 200 using a network-initiated NAS transport procedure. In particular, according to an embodiment, the URSP rule and/or the validity condition (and thus RSDs) is provided to the terminal device 200 from a PCF entity 300a of the home network 110a of the terminal device 200.

Further, the PCF entity 300b in the local serving network 110b might provide URSP rules that comprise additional RSD components supported in the local serving network 110b, such as IMS Voice over PS support, to the terminal device 200.

Further, the PCF entity 300b in the local serving network 110b might modify existing URSP rules to address requirements in the local serving network 110b and provide these modified URSP rules to the terminal device 200. Hence, according to an embodiment, the terminal device 200 is configured to perform (optional) steps S108 and S110:

S108: The terminal device 200a obtains modification to the URSP rule. The modification originates from a PCF entity 300b of the local serving network 110b. The modification defines a modified URSP rule.

S110: The terminal device 200a updates S110 the URSP rule according to the modification. The terminal device 200a thereby replaces the URSP rule with the modified URSP rule (in the terminal device 200).

As indicated by S112 in FIG. 1, upon having updated the URSP rule, step S102 might be entered again (but with the thus modified URSP rule).

There could be different ways in which URSP rules could be modified.

In some aspects the modification defines one or more new URSP rules, possible with one or more new validity conditions for each new URSP rule. That is, according to an embodiment, the modification defines a new URSP rule with associated validity condition. The validity condition might be associated with the RSD within the URSP rule.

In some aspects the modification defines one or more new conditions to one or more existing URSP rules (thus without changing the URSP rule(s) as such). That is, according to an embodiment, the modification defines a new validity condition for the URSP rule.

There could be different types of traffics to be communicated in the communication session established in S106. In some aspects, the traffic is downlink traffic. That is, according to an embodiment, the traffic to be communicated is to be received by the terminal device 200. In some aspects, the traffic is uplink traffic. That is, according to an embodiment, the traffic to be communicated is to be transmitted by the terminal device 200.

There could be different types of communication sessions that are established in S106. In some embodiments, the communication session is a PDU session.

Figure 3:
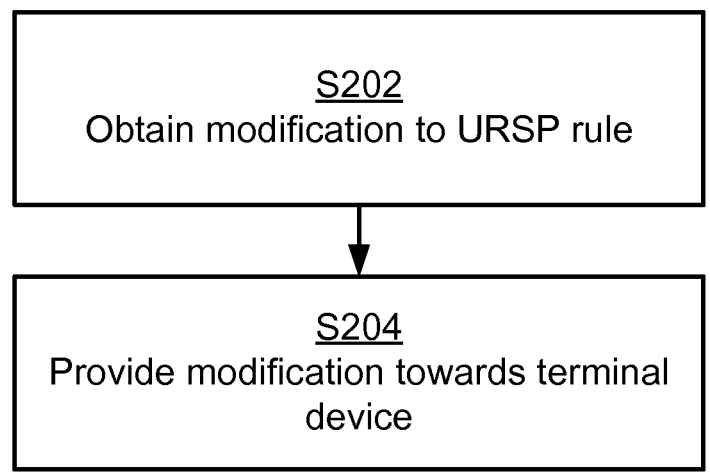

Reference is now made to FIG. 3 illustrating a method for enabling a terminal device 200 to establish a communication session with a local serving network 110b as performed by a PCF entity 300b of the local serving network 110b according to an embodiment.

S202: The PCF entity 300b obtains a modification to a URSP rule used by the terminal device 200 for establishing a communication session with the local serving network 110b for communicating traffic. As disclosed above, the URSP rule is associated with a validity condition. As disclosed above, the validity condition at least pertains to network support for IMS in the local serving network 110b.

S204: The PCF entity 300b provides the modification of the URSP rule towards the terminal device 200.

Embodiments relating to further details of enabling a terminal device 200 to establish a communication session with a local serving network 110b as performed by the PCF entity 300b will now be disclosed.

In general terms, the embodiments, aspects and examples as described above with reference to the terminal device 200 apply also to the PCF entity 300.

As disclosed above, according to an embodiment, the validity condition pertaining to network support for IMS requires that IMS voice over PS is supported in the local serving network 110b.

Examples of further validity conditions have been disclosed above.

As disclosed above, there could be different ways in which URSP rules could be modified.

In some aspects, the modification defines one or more new URSP rules, possible with one or more new validity conditions for each new URSP rule. That is, according to an embodiment, the modification defines a new URSP rule with associated validity condition. The validity condition might be associated with the RSD within the URSP rule.

In some aspects, the modification defines one or more new conditions to one or more existing URSP rules (thus without changing the URSP rule(s) as such). That is, according to an embodiment, the modification defines a new validity condition for the URSP rule.

There could be different ways for the PCF entity 300b to obtain the modification to the URSP rule.

In some aspects the modification to the URSP rule is made at the PCF entity 300a of the home network 110a and the PCF entity 300b obtains the modification to the URSP rule from PCF entity 300a when the terminal device 200 is served by the local serving network 110b. That is, according to an embodiment, the modification is obtained from a PCF entity 300a of the home network 110a of the terminal device 200. In other aspects the modification to the URSP rule originates from conditions in the local serving network 110b having been changed, where the conditions cause a network policy (or just policy for short) to be modified. That is, according to an embodiment, the modification is obtained by means of a policy of the PCF entity 300b being modified.

Figure 4:
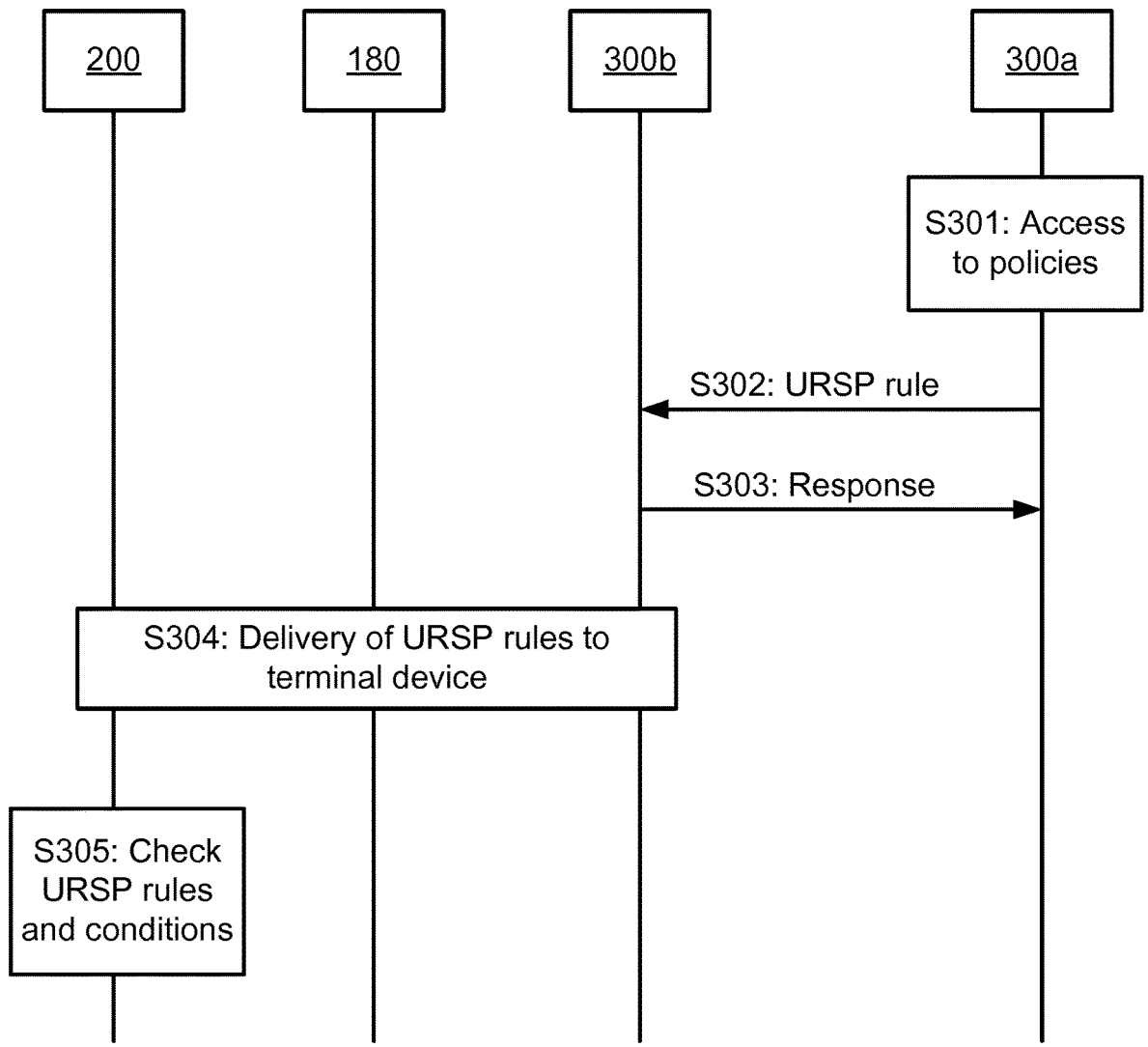
FIG. 4 is a signalling diagram according to an embodiment.

One particular embodiment for provision of a modification of a URSP rule to the terminal device 200 based on at least some of the above disclosed embodiments will now be disclosed in detail with reference to the signalling diagram of FIG. 4. With reference to FIG. 4, the PCF entity 300a of the home network 110a will be denoted (H-)PCF 300a and the PCF entity 300b of the local serving network 11ba will be denoted (V-)PCF 300b.

S301: The (H-)PCF entity 300a has access to mobile network operator policies that indicate whether an IMS application requires support of e.g. IMS voice over PS to be established. This is provided as a validity condition for a URSP rule.

S302: The (H-)PCF entity 300a sends to (V-)PCF entity 300b a URSP rule that includes a traffic descriptor to identify IMS DNN, and an RSD that includes two S-NSSAI components, denoted S-NSSAI_1 and S-NSSAI_2. The RSD component for S-NSSAI_1 requires support for IMS voice over PS and the RSD component for S-NSSAI_2 does not require support for IMS voice over PS. The (H-)PCF entity 300a sends to (V-)PCF entity 300b a URSP rule for the terminal device 200 that includes the support for IMS voice over PS as a validity condition to the RSD component for S-NSSAI 1.

S303: The (V-)PCF entity 300b sends a response to (H-)PCF entity 300a. In a non-roaming case, this step does not apply, but the (H-)PCF entity 300a sends the URSP rule to the AMF 180 of the home network 110a. Further, (V-)PCF entity 300b might check the URSP rules as received from (H-)PCF entity 300a. (V-)PCF entity 300b might have different conditions per roaming partner, and (V-)PCF entity 300b might update the conditions in the RSD. The (V-)PCF entity 300b then reports to (H-)PCF entity 300a that the URSP rules have been updated.

S304: The (V-PCF) entity 300b delivers the URSP rules to the terminal device 200 via the AMF 180 by following steps 1 to 5 in FIG. 4.2.4.3-1 of aforementioned 3GPP TS 23.502.

S305: The terminal device 200 checks the received URSP rules and upon obtaining an indication of traffic to be communicated, where the traffic is associated with a traffic descriptor, the terminal device 200 selects a URSP rule for the traffic to be communicated in a communication session with the local serving network 110b, where the URSP rule is selected in accordance with the traffic descriptor and in accordance with a validity condition for the communication session.

Table 1 shows examples of URSP rules in accordance with embodiments disclosed herein. Table 1 is based on an extension of Table A-1 in Annex A of aforementioned 3GPP TS 23.503.

Table 2 shows examples of the structure of URSP rules in accordance with embodiments disclosed herein. Table 2 is based on an extension of Table 6.6.2.1-3 in clause 6.6.2.1 of aforementioned 3GPP TS 23.503.

TABLE 1

| | Example URSP rules | Comments |
|---|---|---|
| Rule Precedence = 1<br>Traffic Descriptor:<br>Application<br>Identifiers = App1 | Route Selection Descriptor<br>Precedence = 1<br>Network Slice Selection: S-NSSAI-a<br>SSC Mode Selection: SSC Mode 1<br>DNN Selection: IMS<br>Access Type preference: 3GPP access<br>Condition: IMS voice over PS supported, Interworking with N26 | This URSP rule associates the traffic of application "App1" with S-NSSAI-a, SSC Mode 1, 3GPP access and the "IMS" DNN.<br>It enforces the following routing policy:<br>The traffic of App1 should be transferred on a PDU session supporting S-NSSAI-a, SSC Mode 1 and DNN = IMS over 3GPP access. If this PDU session is not established, and IMS Voice over PS and interworking with N26 is supported, the UE shall attempt to establish a PDU session with S-NSSAI-a, SSC Mode 1 and the "IMS" DNN over 3GPP access. |
| Rule Precedence = 2<br>Traffic Descriptor:<br>Application<br>Identifiers = App2 | Route Selection Descriptor<br>Precedence = 1<br>Network Slice Selection: S-NSSAI-a<br>Access Type preference: Non-3GPP access<br>Route Selection Descriptor<br>Precedence = 2<br>Non-seamless Offload indication: Permitted (WLAN SSID-a) | This URSP rule associates the traffic of application "App2" with S-NSSAI-a and Non-3GPP access.<br>It enforces the following routing policy:<br>The traffic of application App2 should be transferred on.<br>a PDU session supporting S-NSSAI-a using a Non-3GPP access. If this PDU session is not established, the UE shall attempt to establish a PDU session with S-NSSAI-a over Access Type = non-3GPP access.<br>If the PDU session cannot be established, the traffic of App2 shall be directly offloaded to WLAN, if the UE is connected to a WLAN with SSID-a (based on the 2nd RSD) |

TABLE 1-continued

| Example URSP rules | | Comments |
|---|---|---|
| Rule Precedence = 3<br>Traffic Descriptor:<br>DNN = DNN__1 | Route Selection Descriptor<br>Precedence = 1<br>Network Slice Selection: S-NSSAI-a<br>Access Type preference: Non-3GPP access | This URSP rule associates the traffic of applications that are configured to use DNN__1 with DNN__1, S-NSSAI-a over Non-3GPP access.<br>It enforces the following routing policy:<br>The traffic of application(s) that are configured to use DNN__1 should be transferred on a PDU session supporting S-NSSAI-a over Non-3GPP access. If this PDU session is not established, the UE shall attempt to establish the PDU session with S-NSSAI-a over Non-3GPP access. |
| Rule Precedence = 4<br>Traffic Descriptor:<br>Application<br>Identifiers = App1<br>Connection<br>Capabilities = "internet", "supl" | Route Selection Descriptor<br>Precedence = 1<br>Network Slice Selection: S-NSSAI-a<br>DNN Selection: DNN__1<br>Access Type preference: Non-3GPP access | This URSP rule associates the application "App1" and the Connection Capabilities "internet" and "supl" with DNN__1, S-NSSAI-a over Non-3GPP access.<br>It enforces the following routing policy:<br>When the "App1" requests a network connection with Connection Capability "internet" or "supl", the UE establishes (if not already established) a PDU session with DNN__1 and S-NSSAI-a over Non-3GPP access. After that, the UE routes the traffic of "App1" over this PDU session. |
| Rule Precedence = lowest priority<br>Traffic Descriptor: * | Route Selection Descriptor<br>Precedence = 1<br>Network Slice Selection: S-NSSAI-b<br>SSC Mode Selection: SSC Mode 3<br>DNN Selection: internet | This URSP rule associates all traffic not matching any prior rule a PDU Session with S-NSSAI-b, SSC Mode 3 and the "internet" DNN.<br>It enforces the following routing policy:<br>All traffic not matching any prior rule should be transferred on a PDU session supporting S-NSSAI-b, SSC Mode 3 and DNN = internet with no access network preference. |

TABLE 2

| Information name | Description | Category | PCF permitted to modify in URSP | Scope |
|---|---|---|---|---|
| Route Selection Descriptor Precedence | Determines the order in which the Route Selection Descriptors are to be applied. | Mandatory (NOTE 1) | Yes | UE context |
| Route selection components | This part defines the route selection components | Mandatory (NOTE 2) | | |
| SSC Mode Selection | One single value of SSC mode.<br>(NOTE 5) | Optional | Yes | UE context |
| Network Slice Selection | Either a single value or a list of values of S-NSSAI(s). | Optional (NOTE 3) | Yes | UE context |
| DNN Selection | Either a single value or a list of values of DNN(s). | Optional | Yes | UE context |
| PDU Session Type Selection | One single value of PDU Session Type | Optional | Yes | UE context |
| Non-Seamless Offload indication | Indicates if the traffic of the matching application is to be offloaded to non-3GPP access outside of a PDU Session. | Optional (NOTE 4) | Yes | UE context |
| Access Type preference | Indicates the preferred Access Type (3GPP or non-3GPP or Multi-Access) when the UE establishes a PDU Session for the matching application. | Optional | Yes | UE context |
| Route Selection Validation Criteria (NOTE 6) | This part defines the Route Validation Criteria components | Optional | | |
| Time Window | The time window when the matching traffic is allowed. The RSD is not considered to be valid if the current time is not in the time window. | Optional | Yes | UE context |

TABLE 2-continued

| Information name | Description | Category | PCF permitted to modify in URSP | Scope |
| --- | --- | --- | --- | --- |
| Location Criteria | The UE location where the matching traffic is allowed. The RSD rule is not considered to be valid if the UE location does not match the location criteria. | Optional | Yes | UE context |
| IMS Voice Support over PS | The VPLMN Support for IMS Voice | Conditional (NOTE 8) | Yes | UE context |
| IMS Emergency | The VPLMN Support for IMS Emergency | Conditional (NOTE 8) | Yes | UE context |
| N26 support | The VPLMN Support for N26 | Conditional (NOTE 8) | Yes | UE context |

Figure 5:
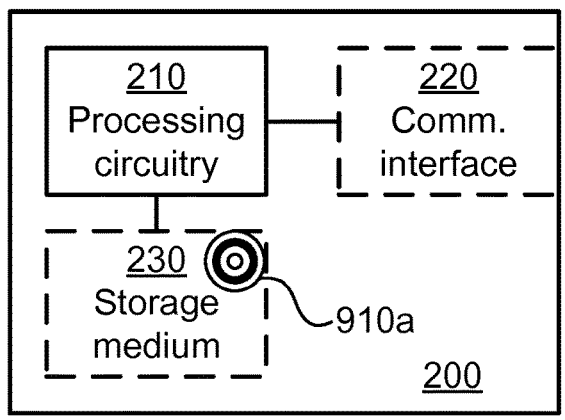
FIG. 5 is a schematic diagram showing functional units of a terminal device according to an embodiment.

(NOTE 1):
Every Route Selection Descriptor in the list shall have a different precedence value.
(NOTE 2):
At least one of the route selection components shall be present.
(NOTE 3):
When the Subscription Information contains only one S-NSSAI in UDR, the PCF needs not provision the UE with S-NSSAI in the Network Slice Selection information. The "match all" URSP rule has one S-NSSAI at most.
(NOTE 4):
If this indication is present in a Route Selection Descriptor, no other components shall be included in the Route Selection Descriptor.
(NOTE 5):
The SSC Mode 3 shall only be used when the PDU Session Type is IP.
(NOTE 6):
The Route Selection Descriptor is not considered valid unless all the provided Validation Criteria are met.
NOTE 7:
In this release of specification, inclusion of the Validation Criteria in Roaming scenarios is not considered.
(NOTE 8):
Applicable for DNN selection set to "IMS" or when the Traffic Description in the URSP rule provides a DNN FIG. 5 schematically illustrates, in terms of a number of functional units, the components of a terminal device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910a (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the terminal device 200 to perform a set of operations, or steps, as disclosed above. For example, the storage medium 230 may store the set of operations, and the processing circuitry 210 may be configured to retrieve the set of operations from the storage medium 230 to cause the terminal device 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The terminal device 200 may further comprise a communications interface 220 for communications with other entities, nodes, functions, and devices of the communication network 100. As such the communications interface 220 may comprise one or more transmitters and receivers, comprising analogue and digital components.

The processing circuitry 210 controls the general operation of the terminal device 200 e.g. by sending data and control signals to the communications interface 220 and the storage medium 230, by receiving data and reports from the communications interface 220, and by retrieving data and instructions from the storage medium 230. Other components, as well as the related functionality, of the terminal device 200 are omitted in order not to obscure the concepts presented herein.

Figure 6:
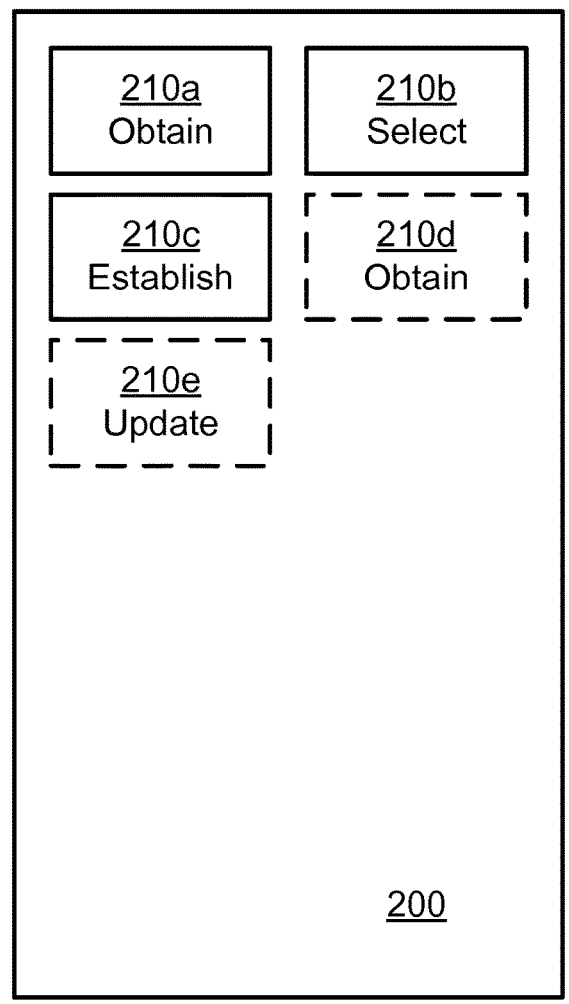
FIG. 6 is a schematic diagram showing functional modules of a terminal device according to an embodiment.

FIG. 6 schematically illustrates, in terms of a number of functional modules, the components of a terminal device 200 according to an embodiment. The terminal device 200 of FIG. 6 comprises a number of functional modules; an obtain module 210a configured to perform step S102, a select module 210b configured to perform step S104, and an establish module 210c configured to perform step S106. The terminal device 200 of FIG. 6 may further comprise a number of optional functional modules, such as any of an obtain module 210d configured to perform step S108, and an update module 210e configured to perform step S110. In general terms, each functional module 210a-210e may be implemented in hardware or in software. Preferably, one or more or all functional modules 210a-210e may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210e and to execute these instructions, thereby performing any steps of the terminal device 200 as disclosed herein.

Figure 7:
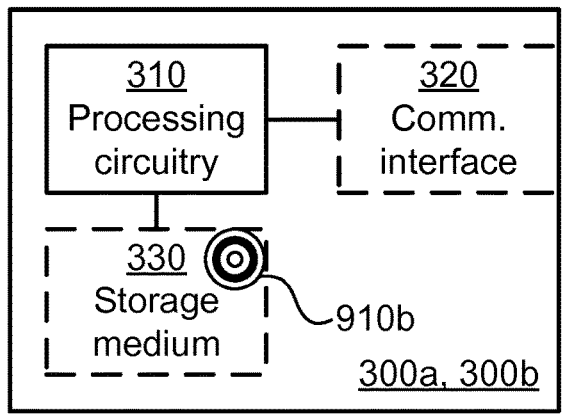
FIG. 7 is a schematic diagram showing functional units of a PCF entity according to an embodiment.

FIG. 7 schematically illustrates, in terms of a number of functional units, the components of a PCF entity 300b according to an embodiment. Processing circuitry 310 is provided using any combination of one or more of a suitable central processing unit (CPU), multiprocessor, microcontroller, digital signal processor (DSP), etc., capable of executing software instructions stored in a computer program product 910b (as in FIG. 9), e.g. in the form of a storage medium 330. The processing circuitry 310 may further be provided as at least one application specific integrated circuit (ASIC), or field programmable gate array (FPGA).

Particularly, the processing circuitry 310 is configured to cause the PCF entity 300b to perform a set of operations, or steps, as disclosed above. For example, the storage medium 330 may store the set of operations, and the processing circuitry 310 may be configured to retrieve the set of operations from the storage medium 330 to cause the PCF entity 300b to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The PCF entity 300b may further comprise a communications interface 320 for communications with other entities, nodes, functions, and devices of the communication network 100. As such the communications interface 320 may comprise one or more transmitters and receivers, comprising analogue and digital components.

The processing circuitry 310 controls the general operation of the PCF entity 300b e.g. by sending data and control signals to the communications interface 320 and the storage medium 330, by receiving data and reports from the communications interface 320, and by retrieving data and instructions from the storage medium 330. Other components, as well as the related functionality, of the PCF entity 300b are omitted in order not to obscure the concepts presented herein.

Figure 8:
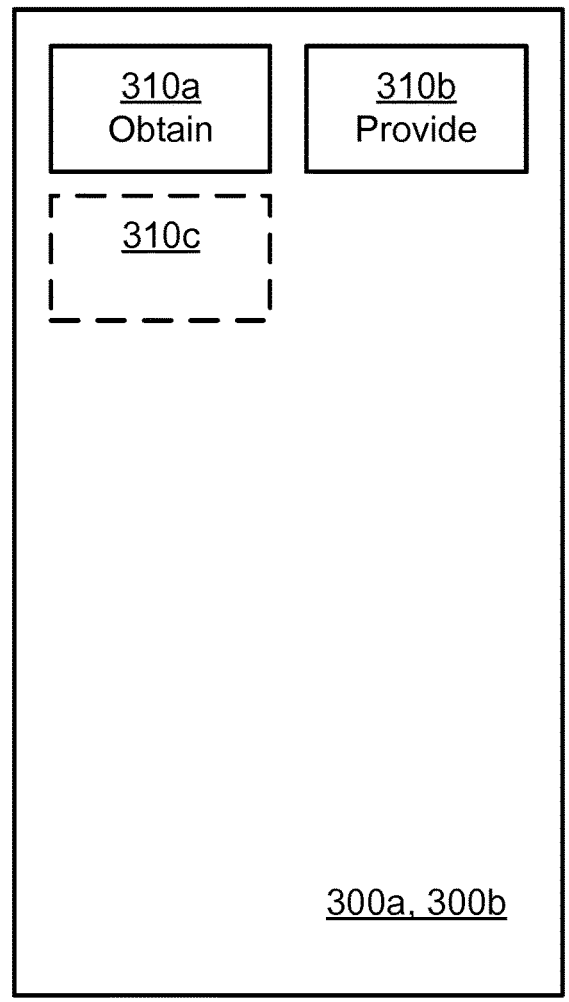
FIG. 8 is a schematic diagram showing functional modules of a PCF entity according to an embodiment.

FIG. 8 schematically illustrates, in terms of a number of functional modules, the components of a PCF entity 300b according to an embodiment. The PCF entity 300b of FIG. 8 comprises a number of functional modules; an obtain module 310a configured to perform step S302, and a provide module 310b configured to perform step S304. The PCF entity 300b of FIG. 8 may further comprise a number of optional functional modules, as illustrated by functional module 310c. In general terms, each functional module 310a-310c may be implemented in hardware or in software. Preferably, one or more or all functional modules 310a-310c may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310c and to execute these instructions, thereby performing any steps of the PCF entity 300b as disclosed herein.

The PCF entity 300b may be provided as a standalone device or as a part of at least one further device. For example, the PCF entity 300b may be provided in a core network node. Further, functionality of the PCF entity 300b may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time.

Thus, a first portion of the instructions performed by the PCF entity 300b may be executed in a first device, and a second portion of the instructions performed by the PCF entity 300b may be executed in a second device; the herein disclosed embodiments are not limited to any particular number of devices on which the instructions performed by the PCF entity 300b may be executed. Hence, the methods according to the herein disclosed embodiments are suitable to be performed by a PCF entity 300b residing in a cloud computational environment. Therefore, although a single processing circuitry 310 is illustrated in FIG. 7 the processing circuitry 310 may be distributed among a plurality of devices, or nodes. The same applies to the functional modules 310a-310c of FIG. 8 and the computer program 920b of FIG. 9.

Figure 9:
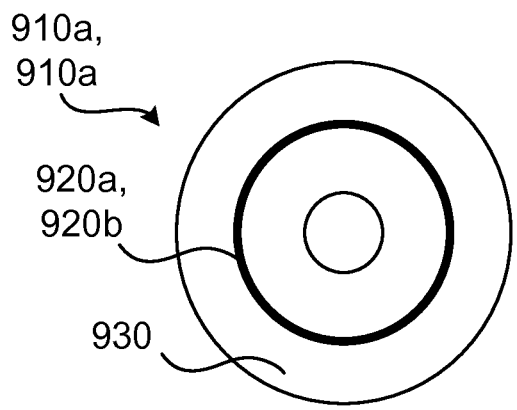
FIG. 9 shows one example of a computer program product comprising computer readable means according to an embodiment.

FIG. 9 shows one example of a computer program product 910a, 910b comprising computer readable means 930. On this computer readable means 930, a computer program 920a can be stored, which computer program 920a can cause the processing circuitry 210 and thereto operatively coupled entities and devices, such as the communications interface 220 and the storage medium 230, to execute methods according to embodiments described herein. The computer program 920a and/or computer program product 910a may thus provide means for performing any steps of the terminal device 200 as herein disclosed. On this computer readable means 930, a computer program 920b can be stored, which computer program 920b can cause the processing circuitry 310 and thereto operatively coupled entities and devices, such as the communications interface 320 and the storage medium 330, to execute methods according to embodiments described herein. The computer program 920b and/or computer program product 910b may thus provide means for performing any steps of the PCF entity 300b as herein disclosed.

In the example of FIG. 9, the computer program product 910a, 910b is illustrated as an optical disc, such as a CD (compact disc) or a DVD (digital versatile disc) or a Blu-Ray disc. The computer program product 910a, 910b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920a, 920b is here schematically shown as a track on the depicted optical disk, the computer program 920a, 920b can be stored in any way which is suitable for the computer program product 910a, 910b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A terminal device configured to establish a communication session with a local serving network, the terminal device comprising processing circuitry configured to cause the terminal device to:
obtain a modification of a User Equipment Route Selection Policy, USRP, rule and a validity condition, the validity condition requiring that IP Multimedia Subsystem (IMS) voice over PS is supported in the local serving network;
obtain an indication of traffic to be communicated, the traffic being associated with a traffic descriptor;
select the first User Equipment Route Selection Policy (URSP) rule if the local serving network is a home network, or select a second URSP rule if the local serving network is a roaming network;

the selected URSP rule for the traffic to be communicated in a communication session with the local serving network, the selected URSP rule being selected in accordance with the traffic descriptor and in accordance with the validity condition, the validity condition pertaining to support for IMS in the local serving network;

establish a communication session with the local serving network for communicating the traffic according to the selected URSP rule; and the communication session is a protocol data unit (PDU) session.

2. The terminal device of claim 1, wherein the validity condition also pertains to at least one of the following:
emergency support in the local serving network,
the local serving network supporting interworking over network interface N26,
the local serving network supporting interworking without network interface N26,
mobile country code (MCC) of the local serving network, and
mobile network code (MNC) of the local serving network.

3. The terminal device of claim 1, wherein the URSP rule is selected from a set of URSP rules.

4. The terminal device of claim 3, wherein the URSP rule is selected from among only the URSP rules, of the set, for which the validity condition for the communication session is fulfilled.

5. The terminal device of claim 1, wherein at least one of the URSP rule and the validity condition is configured in the terminal device or is provided to the terminal device from a policy control function (PCF) of the terminal device's home network.

6. The terminal device of claim 5, wherein the processing circuitry is further configured to cause the terminal device to:
obtain a modification to the URSP rule, the modification originating from a PCF of the local serving network; and
update the URSP rule according to the modification.

7. The terminal device of claim 6, wherein the modification defines one of the following: a new URSP rule with an associated validity condition, or a new validity condition for the URSP rule.

8. A policy control function (PCF) configured to enable a terminal device to establish a communication session with a local serving network, the PCF comprising processing circuitry configured to cause the PCF to:
select a first User Equipment Route Selection Policy (URSP) rule if the local serving network is a home network, or select a second URSP rule if the local serving network is a roaming network;
obtain a modification to the selected URSP rule used by the terminal device for establishing a communication session with the local serving network for communicating traffic, the selected URSP rule being associated with a validity condition for the communication session, the validity condition pertaining to support for IP Multimedia Subsystem (IMS) in the local serving network, the validity condition requiring that IMS voice over PS is supported in the local serving network; and
provide the modification of the selected URSP rule towards the terminal device.

9. The PCF of claim 8, wherein the modification defines one of the following: a new URSP rule with an associated validity condition, or a new validity condition for the URSP rule used by the terminal device.

10. The PCF of claim 8, wherein the validity condition also pertains to at least one of the following:
emergency support in the local serving network,
the local serving network supporting interworking over network interface N26,
the local serving network supporting interworking without network interface N26,
mobile country code (MCC) of the local serving network, and
mobile network code (MNC) of the local serving network.

11. The PCF of claim 8, wherein the modification is obtained based on one of the following: via a policy of the PCF, or from a PCF of the terminal device's home network.

12. A method performed by a terminal device for establishing a communication session with a local serving network, the method comprising:
obtaining a modification of a User Equipment Route Selection Policy, USRP, rule and a validity condition, the validity condition requiring that IP Multimedia Subsystem (IMS) voice over PS is supported in the local serving network;
obtaining an indication of traffic to be communicated, the traffic being associated with a traffic descriptor;
select the first User Equipment Route Selection Policy (URSP) rule if the local serving network is a home network, or select a second URSP rule if the local serving network is a roaming network;
the selected URSP rule for the traffic to be communicated in a communication session with the local serving network, the selected URSP rule being selected in accordance with the traffic descriptor and in accordance with the validity condition, the validity condition pertaining to support for IP IMS in the local serving network; and
establishing a communication session with the local serving network for communicating the traffic according to the selected URSP rule.

13. The method of claim 12, wherein at least one of the URSP rule and the validity condition is configured in the terminal device or is provided to the terminal device from a policy control function (PCF) of the terminal device's home network.

14. The method of claim 13, further comprising:
obtaining a modification to the URSP rule, the modification originating from a PCF of the local serving network; and
updating the URSP rule according to the modification.

15. A method performed by a policy control function (PCF) of a local serving network for enabling a terminal device to establish a communication session with the local serving network, the method comprising:
selecting a first User Equipment Route Selection Policy (URSP) rule if the local serving network is a home network, or select a second URSP rule if the local serving network is a roaming network;
obtaining a modification to the selected URSP rule used by the terminal device for establishing a communication session with the local serving network for communicating traffic, the selected URSP rule being associated with a validity condition for the communication session, the validity condition pertaining to support for IP Multimedia Subsystem (IMS) in the local serving network, the validity condition requiring that IMS voice over PS is supported in the local serving network; and providing the modification of the selected URSP rule towards the terminal device.

\* \* \* \* \*